March 31, 1964  R. F. McCAMMON ETAL  3,127,112
PHOTOGRAPHIC FLASH TUBE AND REFLECTOR
Filed April 6, 1962
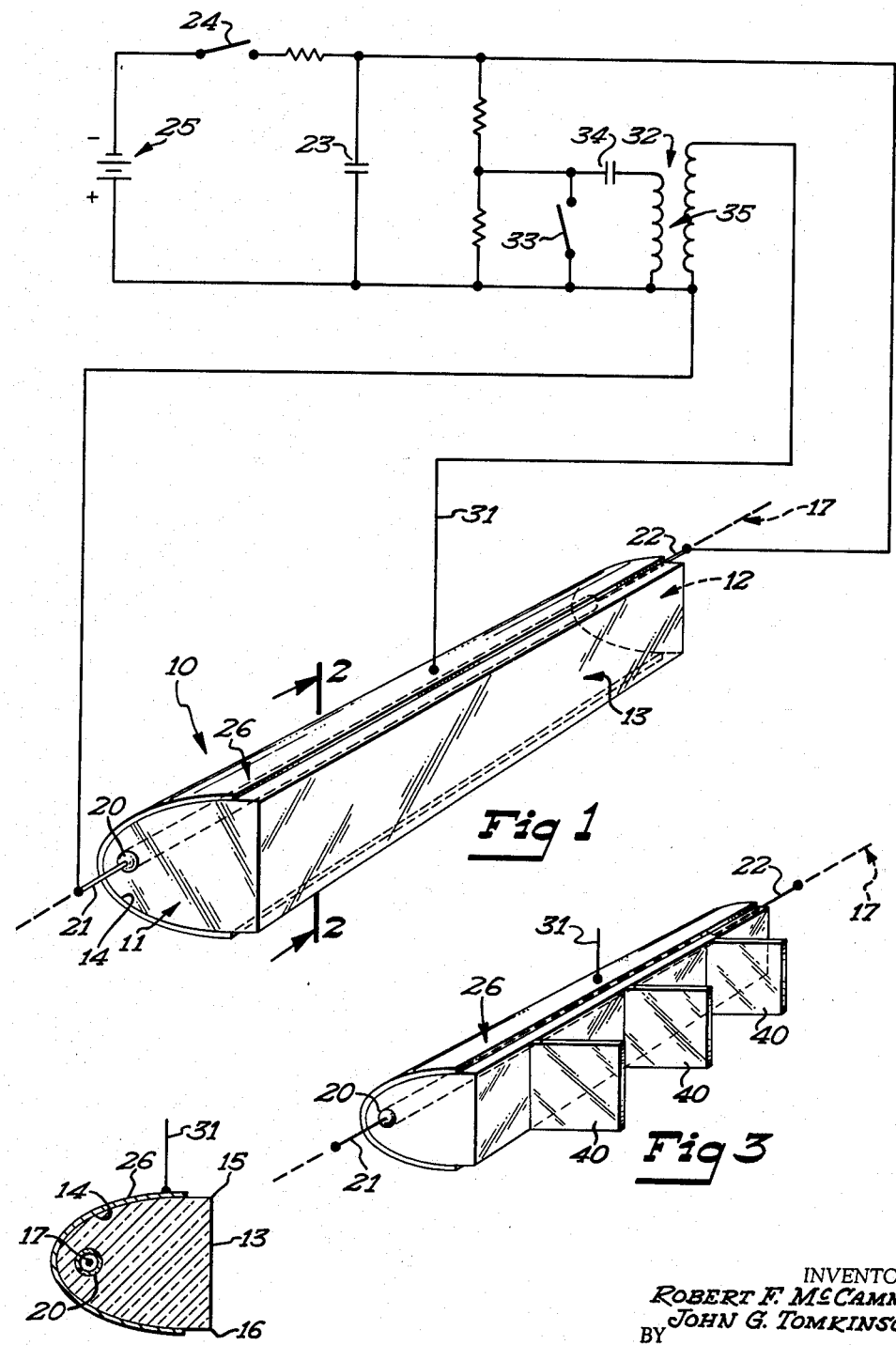
INVENTORS
ROBERT F. McCAMMON,
JOHN G. TOMKINSON
BY
Francis A. Sim
ATTORNEY

United States Patent Office 3,127,112
Patented Mar. 31, 1964

3,127,112
PHOTOGRAPHIC FLASH TUBE AND REFLECTOR
Robert F. McCammon and John G. Tomkinson, Denver, Colo., assignors to Minneapolis-Honeywell Regulator Company, Minneapolis, Minn., a corporation of Delaware
Filed Apr. 6, 1962, Ser. No. 185,720
6 Claims. (Cl. 240—1.3)

The present invention is concerned with a compact, unitary photographic flash tube and reflector.

Electronic photographic flash apparatus can be defined as photographic flash apparatus in which electrical energy is accumulated or stored in a main flash capacitor and is then selectively discharged through a photographic flash tube. Photographic flash tubes are constructed and arranged to provide a pair of main discharge electrodes which are connected to the flash capacitor and are disposed in a gaseous medium through which an electrical discharge passes as the flash capacitor is discharged between the electrodes. To initiate the starting of such a discharge, a trigger electrode is associated with the electronic flash tube and this trigger electrode is energized by means including a switch usually operated in synchronism with the shutter of a photographic camera. The light pattern emitted from such a flash tube is then controlled by a reflector to illuminate a scene to be photographed, this scene being captured on the film in the associated camera.

Apparatus of this type has found wide acceptance in the photographic industry by virtue of the fact that photographic flash tubes may be constructed and arranged with a color temperature compatible with many films commercially available. Furthermore, the cost of operation, per picture, of such a flash unit is held to a minimum, the only portion of the flash apparatus needing replacement being the primary source of voltage, either low or high voltage batteries, depending upon the type of photographic flash apparatus being considered.

Recent developments in the photographic flash art have provided single piece flash units adapted to be mounted at the camera to provide a single unit to be hand supported by the photographer. This single unit incorporates all of the components of the electronic flash apparatus, including the battery source, the flash capacitor, the trigger circuit for the flash tube, and the flash tube and reflector. Obviously, the smaller and the lighter weight such a flash unit can be made, the more acceptable it is to the photographer, provided the light intensity and light pattern achieved is not sacrificed to the weight and size consideration.

With the above background in mind, the present invention is directed to a compact and lightweight unitary flash tube and reflector configuration which occupies a minimum amount of physical space and which provides a unique reflector and triggering electrode combination in a unique flash tube configuration. Specifically, the construction of our invention provides a solid block or slug of light transparent material, for example glass, which is formed such that a major portion of the surface thereof constitutes a geometric curve of predetermined configuration, for example an ellipse. This portion of the structure is elongated and the elliptical portion has a plurality of focal points defining a focal line within the member or, in other words, the elliptical cross section includes a focal point, the locus of which defines a line along the longitudinal axis of the member, this line being disposed within the glass member.

The flash tube is constructed and arranged to coincide with an opening formed coincident with locus of the focal point, and opposite ends of the glass member support or include the main discharge electrodes adapted to be connected to the main flash capacitor of the photographic flash unit. A combination trigger electrode and reflector is formed by a light reflecting, electrically conductive surface formed or deposited over the glass member on the elliptical portion of the member. Thus, the elliptical portion of the member, containing the metallic reflector member, is operatively associated with the electronic flash tube to constitute the triggering electrode of this flash tube. Furthermore, the light thus emitted from the flash tube is controlled in a direction perpendicular to the longitudinal axis of the glass member by means of the elliptical reflector thus formed.

As a further feature of our invention, we provide baffle plates or forwardly extending opaque members which control the light pattern of the flash tube and reflector parallel to the longitudinal axis thereof.

The present invention will be apparent to those skilled in the art upon reference to the following specification, claims, and drawings, of which:

FIGURE 1 is a perspective view of the combination photographic flash tube and reflector of our invention, showing the main current conducting electrodes and trigger electrode connected to an electrical circuitry defining a photographic flash apparatus of the high voltage battery operated type, FIGURE 2 is a cross-section view of the photographic flash tube and reflector of FIGURE 1, taken along the section line designated 2—2, and FIGURE 3 is a view of the photographic flash tube and reflector of FIGURE 1 wherein the above described baffle plates are provided to control the light pattern parallel to the longitudinal axis of the combination photographic flash tube and reflector.

Referring specifically to FIGURE 1, reference numeral 10 designates generally the improved photographic flash tube and reflector of our invention. This photographic flash tube and reflector is composed of a solid elongated light transparent member having oppositely disposed end surfaces 11 and 12, an elongated forward directed front face surface 13, and a rear portion 14, formed as a geometric curve. The configuration of the light transparent member, preferably glass, can be seen more clearly in FIGURE 2 wherein the member is shown in section. From this view it can be seen that the front face 13 is generally a rectangular plane surface whose opposite edges 15 and 16 are joined by the geometric curve 14. Geometric curve 14 may take a number of forms, as desired. For example, curve 14 may be an ellipse whose focal point coincides with the axis designated generally by means of reference numeral 17. Reference numeral 17 designates the focal line of the elliptical surface 14 and also can be described as the longitudinal axis of the combination flash tube and reflector.

Reference numeral 20 designates generally an elongated opening formed through the glass member, coinciding with axis 17. Positioned within the opening 20 is a photographic flash tube. This photographic flash tube may consist of a unitary structure having an outer glass envelope enclosing a gaseous medium and main current conducting electrodes, or as an alternative, the main current conducting electrodes may be sealed to close the opposite ends of the opening 20, with the glass member itself forming the glass housing which encloses and confines the gas. Reference numerals 21 and 22 designate the main current conducting electrodes of the flash tube, these current conducting electrodes being connected to a main flash capacitor 23 which is adapted to be charged, through an on-off switch 24, by means of a high voltage battery 25.

Reference numeral 26 identifies the combination flash tube reflector and trigger electrode coating. This member 25 consists of a light reflecting substance having electrical conductivity properties. For example, reflector electrode 25 may be a metallic film deposited on the outer geometric curve 14 portion of the glass member.

Reflector electrode 26, constructed of an opaque material which reflects light, cooperates with the flash tube positioned at axis 17, this being the focal line of reflector 26, to direct the light emitted from the flash tube in a forward direction out of the front face 13 of the glass member. The configuration of the curve 14, this corresponding to the reflector curve of member 26, controls the light pattern of the resulting flash tube and reflector combination in a direction which is normal to axis 17.

As has been mentioned, member 26 functions not only as a reflector, but also as a starting electrode in co-operation with the photographic flash tube. Thus, member 26 is connected by means of an electrical conductor 31 to a triggering network designated generally by means of reference numeral 32. This triggering network includes a normally open switch 33, which switch may be the normally open shutter switch of an associated photographic camera. Closing of switch 33 discharges a capacitor 34 through a trigger transformer 35 to provide a high voltage pulse between member 26 and main current conducting electrode 21 of the photographic flash tube. As a result, electrical discharge is initiated within the photographic flash tube and capacitor 23 suddenly discharges between the main current conducting electrodes 21 and 22 to provide a sudden brilliant flash of light.

FIGURE 3 discloses a further embodiment of the present invention wherein reference numeral 40 designates forward extending baffle plates which are arranged perpendicular to axis 17 of the combination photographic flash tube and reflector. While three baffle plates are shown in FIGURE 3, a greater number may be employed, as desired. Baffle plates 40 are constructed of light opaque material and function to divide the reflector into longitudinal segments to thus control the light pattern in a direction along or parallel to axis 17. As a result, the configuration shown in FIGURE 3 provides control of the light pattern in a direction perpendicular to axis 17 (the vertical direction) and in a direction along axis 17 (the horizontal direction).

As can be readily appreciated, the improved photographic flash tube and reflector of our invention may be constructed and arranged to provide a compact photographic flash unit to be mounted at the camera. For example, the portion of the photographic flash unit which houses the reflector and flash tube may be constructed to be only several inches long and only somewhat larger in cross-sectional area than the dimensions of the reflector 26 and the glass member upon which the reflector is positioned. As a result, our invention provides a compact photographic flash unit. However, at the same time that the features of light weight and compactness are achieved, the light pattern is accurately controlled by virtue of the arrangement of reflector 26 coinciding with the flash tube positioned at axis 17, which reflector also serves as the triggering electrode for the photographic flash tube. Furthermore, the baffles 40 of FIGURE 3 achieve further control of the light pattern.

While the preferred embodiment of our invention shows what might be called a linear configuration having a straight axis 17, it is within the teachings of this invention to utilize a structure having an axis which may be somewhat curved, depending upon the light pattern desired.

Other modifications of the present invention will be apparent to those skilled in the art and thus it is intended that the scope of this invention be limited solely by the scope of the appended claims.

We claim as our invention:

1. A unitary photographic flash tube and reflector, comprising;
   a solid elongated member of light transmitting material having a surface thereof formed of a diverging curve, said surface having a focal line within said member,
   flash tube means including an opening through said material coincident with the focal line and including electrode means mounted at spaced points, said electrode means being adapted to be connected to a source of voltage,
   an electrically conductive reflective surface on said surface to define a divergent reflector,
   and starting electrode means, including said reflective surface adapted to be connected to a source of starting voltage.

2. A compact, single piece, photographic flash tube and reflector, comprising;
   a member formed of light transmitting material having a front face and a rearwardly extending portion formed as a geometric curve having a focal point lying within said member, the locus of the focal point defining a focal line within said member,
   an opening formed coincident with said line,
   flash tube means including electrodes disposed at opposite portions of said opening such that an electrical discharge between said electrodes is confined to said line, means sealing said electrodes in said opening so that said member forms the housing of said flash tube means,
   and a light reflecting, electrically conductive coating on the rearwardly extending portion of said member, said coating serving as a reflector and as a starting electrode for said flash tube means.

3. In combination with a photographic flash unit having a main flash capacitor and a trigger circuit,
   a solid member of light transparent material having a forward face portion and a rearward portion formed as a geometric curve having a focal point whose locus defines a focal line within said member,
   an opening formed coincident with said line,
   flash tube means located within said opening and including a pair of spaced electrodes between which an electric discharge may be established to generate light energy,
   means electrically connecting said pair of electrodes to the capacitor,
   an electrically conducting, light reflective coating formed to coincide with the rearward portion of said member to thereby form a reflector having a focal line coinciding with said flash tube means,
   and means electrically connecting said coating to the trigger circuit.

4. A single unit electronic flash tube and reflector comprising;
   an elongated solid glass member having end surfaces, a forwardly extending face surface, and a curved surface forming the portion of said member opposite said face surface, said curved surface having a cross-section as a geometric curve whose focal points lie within said member, the focal points of said surface thus defining an elongated line within said member,
   an opening formed to coincide with said elongated line,
   flash tube means constructed and arranged within said opening, said glass member forming the housing for said flash tube means,
   and a light reflecting conductive coating deposited on the outer surface of said curved surface to define a combination reflector and starting electrode for said flash tube means.

5. A compact single unit photographic flash tube reflector and flash tube trigger electrode, comprising;
   an elongated solid member of light transmitting material, having end walls, a generally flat front face, and a curved back surface which joins the opposite elongated edge of said front face, said back surface being formed, when considering a cross-section thereof, as a geometric curve whose focal point lies within said member, an electrically conductive light reflective coating formed in intimate contact with said back surface to form a reflector whose open end includes said front face, and a flash tube constructed and arranged to coincide with the locus of such focal points, said coating also forming the trigger electrode for said flash tube.

6. A compact single unit photographic flash tube, reflector, and flash tube trigger electrode, comprising;

an elongated solid member of light transmitting material, having end walls, a generally flat front face, and a curved back surface which joins the opposite elongated edges of said front face, said back surface being formed, when considering a cross-section thereof, as a geometric curve whose focal points lie within said member, an electrically conductive light reflective coating formed in intimate contact with said back surface to form a reflector whose open end includes said front face, said reflector controlling the spread of light normal to the length of said elongated member, a photographic flash tube constructed and arranged to coincide with the locus of such focal points, said coating also forming the trigger electrode for said flash tube, and a plurality of flat opaque members extending from said front face away from said member to control the spread of light along the length of said elongated member.

References Cited in the file of this patent

UNITED STATES PATENTS

| | | |
|---|---|---|
| 1,557,553 | Borchardt | Oct. 20, 1925 |
| 1,607,394 | Fauver | Nov. 16, 1926 |
| 2,561,885 | Prideaux et al. | July 24, 1951 |
| 2,749,482 | Fruengel | June 5, 1956 |
| 2,906,862 | McCammon | Sept. 29, 1959 |
| 2,953,721 | Chauvineau | Sept. 20, 1960 |
| 3,037,139 | Myers | May 29, 1962 |

FOREIGN PATENTS

| | | |
|---|---|---|
| 1,111,017 | Germany | July 13, 1961 |